Patented Mar. 9, 1926.

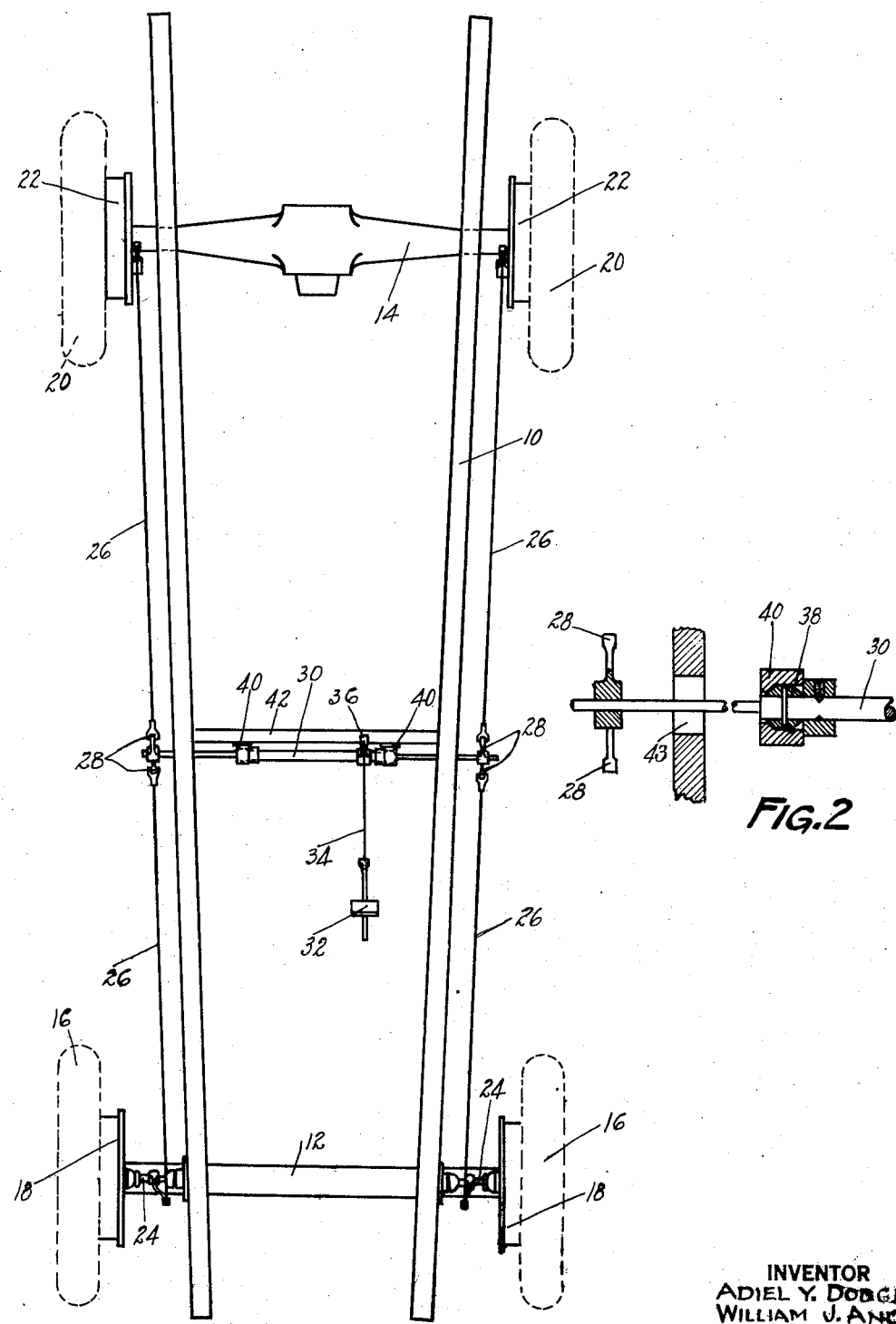

1,576,479

UNITED STATES PATENT OFFICE.

ADIEL Y. DODGE AND WILLIAM J. ANDRES, OF SOUTH BEND, INDIANA, ASSIGNORS TO BENDIX BRAKE COMPANY, OF CHICAGO, ILLINOIS, A CORPORATION OF ILLINOIS.

VEHICLE BRAKE.

Application filed September 23, 1925. Serial No. 58,077.

*To all whom it may concern:*

Be it known that we, ADIEL Y. DODGE and WILLIAM J. ANDRES, citizens of the United States, residing in South Bend, in the county of St. Joseph and State of Indiana, have invented a certain new and useful Improvement in Vehicle Brakes, of which the following is a specification.

This invention relates to vehicle brakes, and is illustrated as embodied in an automobile chassis having brakes on all four wheels. An object of the invention is to provide a novel compromise hookup obtaining substantially all the advantages of a fully-equalized system, without the danger of all the brakes being rendered useless when one brake rod is broken, and while still permitting the automatic relief in pressure on the outside front brake when rounding a corner.

In one desirable arrangement, a single cross rockshaft applies all four brakes, and is supported in a manner permitting its overhanging ends (preferably of reduced diameter) to flex to equalize small differences in pressure between each front brake and the rear brake on the same side of the vehicle. While the flexing of the shaft ends is sufficient to compensate for ordinary differences between brakes which are reasonably well adjusted, the breakage of one, or two, or even three of the connections does not prevent the application of the remaining brakes. The flexing of the shaft, however, prevents the locking of one front brake when the connection is broken to the rear brake on that side.

The above and other objects and features of the invention, including various novel combinations of parts and desirable particular constructions, will be apparent from the following description of one illustrative embodiment shown in the accompanying drawing, in which:

Fig. 1 is a top plan view of the chassis; and

Fig. 2 is a detail section, on a larger scale, showing the manner of supporting the rockshaft.

The chassis illustrated includes a frame 10, supported by the usual springs (not shown) on a front axle 12 and a rear axle 14. The front axle 12 has wheels 16 with brakes 18 swivelled at its ends, while the rear axle 14 is supported on wheels 20 having brakes 22.

Each of the front brakes is shown operated by a floating rockshaft 24 slidably and universally supported on the frame 10 at its inner end and connected to the brake by a universal joint substantially in the swivelling axis of the wheel and having its vertical axis intersecting the swivelling axis at an acute angle, so that the pressure on the outer brake is automatically relieved on a turn. This brake-applying mechanism is described in detail in our prior application No. 18,987, filed March 28, 1925.

According to the present invention, the rear brakes 22, and arms on the shafts 24 of the front brakes 18, are connected, by brake rods or cables 26 or their equivalents, directly to arms 28 on the ends of a rockshaft 30 arranged crosswise of the vehicle. The rockshaft 30 is operated by a pedal or the like 32 connected in any suitable manner, as by a link 34 pivoted to an arm 36 on the rockshaft.

As explained above, some distance from its ends the rockshaft is supported, preferably by self-aligning bearings 38 (Fig. 2) by means such as a pair of brackets 40 carried by a cross member 42 of frame 10.

The overhanging ends of shaft 30, one of which appears in Fig. 2 projecting through a relatively large opening 43 in one of the side frame members, are preferably substantially reduced in diameter, to allow them to flex or whip slightly. A very small amount of flexing, as an eighth of an inch, is sufficient to equalize a very considerable difference in adjustment of the front brake and rear brake connected to that end of the shaft. While the advantages of equalization are thus secured, the breakage of less than all four rods 26 is not enough to prevent application of the remaining brakes, nor is the relief of the outer front brake on a turn in any way interferred with.

While one illustrative embodiment has been described in detail, it is not our intention to limit the scope of the invention to that particular embodiment, or otherwise than by the terms of the appended claims.

We claim:

1. A vehicle having a pair of front wheels having brakes and a pair of rear wheels having brakes, and comprising, in combination therewith, a driver-operated rockshaft extending crosswise of the vehicle, connections from each end of the shaft to the front brake and the rear brake on that side of the vehicle, and means for supporting the rockshaft spaced substantially inwardly from its ends, the end parts of the rockshaft overhanging said means being free to flex slightly to equalize small differences in pressure between the front and rear brakes.

2. A vehicle having a pair of front wheels having brakes and a pair of rear wheels having brakes, and comprising, in combination therewith, a driver-operated rockshaft extending crosswise of the vehicle, connections from each end of the shaft to the front brake and the rear brake on that side of the vehicle, and means for supporting the rockshaft spaced substantially inwardly from its ends, the end parts of the rockshaft overhanging said means being reduced in diameter and free to flex slightly to equalize small differences in pressure between the front and rear brakes.

3. A vehicle having a pair of front wheels having brakes and a pair of rear wheels having brakes, and comprising, in combination therewith, a driver-operated rockshaft extending crosswise of the vehicle, connections from each end of the shaft to the front brake and the rear brake on that side of the vehicle, and brackets for supporting the rockshaft spaced substantially inwardly from its ends, the end parts of the rockshaft overhanging said brackets being free to flex slightly to equalize small differences in pressure between the front and rear brakes.

In testimony whereof we have hereunto signed our names.

ADIEL Y. DODGE.
WILLIAM J. ANDRES.